April 28, 1942.   R. L. BROWN   2,281,228
PROCESS FOR SYNTHESIZING METHANOL
Filed March 3, 1939
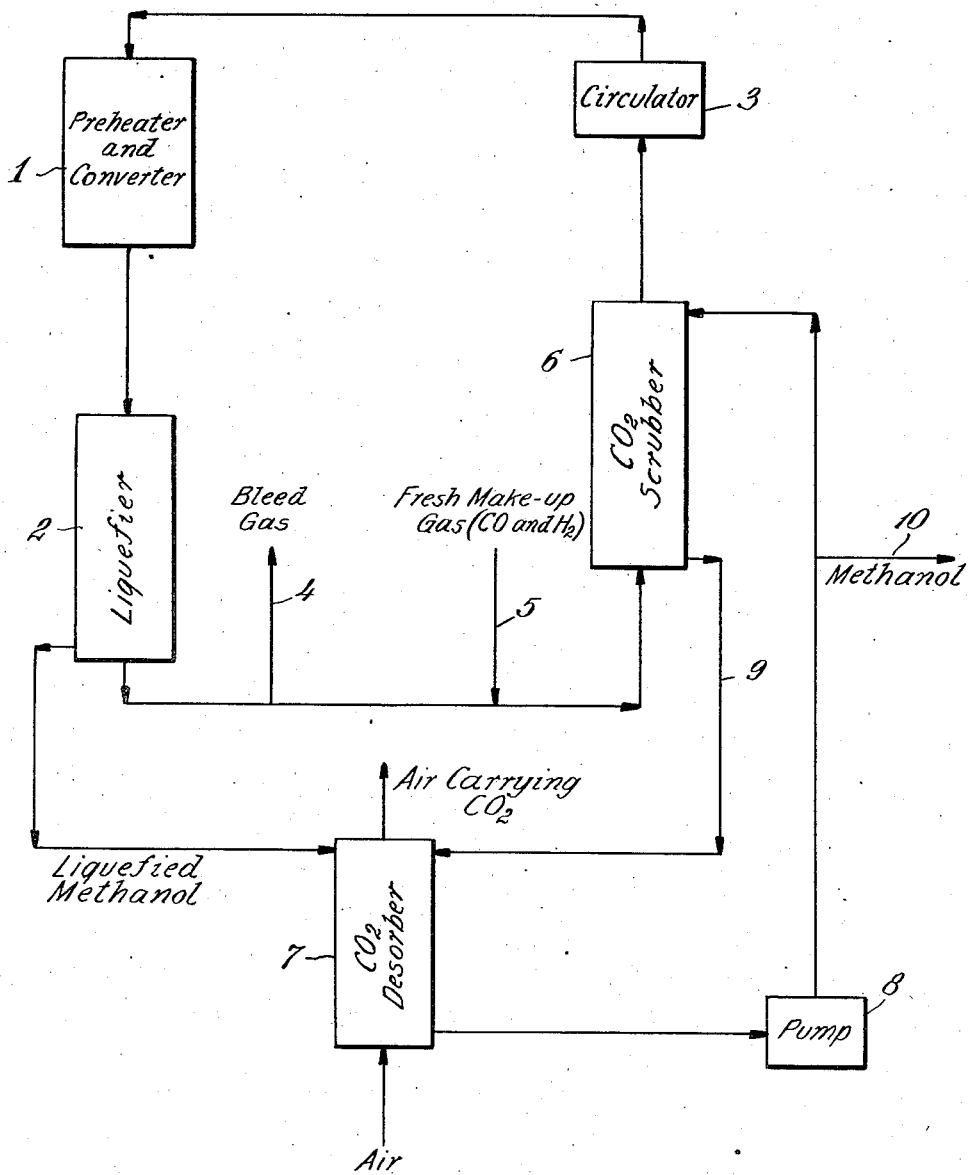
INVENTOR
Ralph L. Brown
BY
Charles W. Brown
ATTORNEY Patented Apr. 28, 1942

2,281,228

UNITED STATES PATENT OFFICE 2,281,228

PROCESS FOR SYNTHESIZING METHANOL

Ralph Lyman Brown, Bala-Cynwyd, Pa., assignor to The Solvay Process Company, New York, N. Y., a corporation of New York Application March 3, 1939, Serial No. 259,622

10 Claims. (Cl. 260—449)

The present invention relates to the synthetic production of methanol by the catalytic treatment of a gas mixture containing hydrogen and carbon monoxide under high pressures.

It is known oxygenated organic compounds may be catalytically synthesized from hydrogen and carbon monoxide and, depending upon the conditions of treatment of such gases, methanol or alcohols containing a larger number of carbon atoms in the molecule or compounds other than alcohols such as ethers and aldehydes may be synthesized. At high pressures, particularly pressures above 50 atmospheres, it is known that by employing certain catalysts at appropriate operating temperatures and gas compositions the oxygenated organic compounds produced will principally consist of methanol and its equivalent, methyl ether, which by hydrolysis readily changes into methyl alcohol.

It has been recognized certain materials, when present in the gas contacted with the catalyst serving to promote the synthesis of methanol and methyl ether, deleteriously affect the activity of the catalyst to promote the synthesis of these products. For example, it has been repeatedly stated in the art metal carbonyls should be excluded from the gases in order to prevent poisoning the catalysts. On the other hand, it has been generally recognized, carbon dioxide is the substantial equivalent of carbon monoxide as a raw material from which methanol may be synthesized by reaction with hydrogen and, since most industrial gases containing carbon monoxide and hydrogen also contain substantial proportions of carbon dioxide, it has customarily been proposed to use for the synthesis of methanol gases containing hydrogen and both of the oxides of carbon, carbon monoxide and carbon dioxide. When it was desired to synthesize primarily higher oxygenated organic compounds than methanol, using catalysts active to promote the reaction of oxides of carbon and hydrogen to form alcohols under operating conditions promoting the formation of higher alcohols rather than methanol, it has been recognized the presence of carbon dioxide decreases the amount of these higher oxygenated organic compounds formed by the synthesis reaction and hence it has been proposed in such processes to keep the carbon dioxide content of the gases at not above 2% to 3% in order to promote the synthesis of the higher compounds.

In catalytically treating a gas containing oxides of carbon and hydrogen for the synthesis of methanol or higher compounds, but a portion of the gas reacts when contacted with the catalyst. It has usually been proposed, therefore, to employ for the synthesis of these products a cyclic synthesis system in which the gases are continuously circulated in contact with the catalyst with removal of synthesized product from the gases leaving the catalyst by cooling them to condense the product before circulating the residual unreacted gases into renewed contact with the catalyst. A portion of the gases circulating in such a system is continuously withdrawn therefrom as "bleed gas" in order to prevent the accumulation to an undesired degree of inert gases in the system and fresh make-up gas is introduced to compensate for the gas bled from the system and that reacted and withdrawn as the synthesized product.

In such a gas circulatory system, irrespective of the presence or absence of carbon dioxide in the fresh make-up gas introduced into the system, the gas circulating therein will contain a substantial proportion of carbon dioxide. Even though the gas initially contains only carbon monoxide and hydrogen, carbon dioxide is formed in contacting it with the catalyst used for the synthesis of the oxygenated organic compounds and there will build up in the system an "equilibrium" proportion of carbon dioxide which will remain substantially constant, depending upon the temperature of operation of the catalyst, the rate of gas bleed from the system and supply of fresh make-up gas and the amount of carbon dioxide removed from the system in solution in the oxygenated organic compounds withdrawn therefrom. With the make-up gas to the system substantially free from carbon dioxide and with the synthesis of the oxygenated organic compounds being carried out under the conditions heretofore known for this procedure, there will be in the gas circulating in the system a substantial concentration of carbon dioxide, which may amount to as much as 15% $CO_2$ or more.

As pointed out above, it has heretofore been generally considered that carbon monoxide and carbon dioxide are equivalent raw materials for reaction with hydrogen to form methanol (except for more hydrogen reacting with the carbon dioxide because of its higher oxygen content). Indeed, it appears to be considered that the ratio of methanol to higher alcohols formed in contacting a gas containing carbon dioxide and carbon monoxide with a methanol synthesis catalyst would be greater than if no carbon dioxide were present in the gas. I have discovered, however, that in synthesizing methanol carbon dioxide exercises a marked deleterious influence upon the activity of the catalyst to synthesize methanol from carbon monoxide and hydrogen. I have found more methanol is obtained from a carbon monoxide gas free from carbon dioxide than when carbon dioxide is present. It would appear the carbon dioxide not only acts as a diluent upon the carbon monoxide and hydrogen gases and introduces the complications of side reactions which do not occur when the gas contacted with the catalyst is substantially free from carbon dioxide, but further, carbon dioxide appears to exercise an actual poisoning effect upon the catalyst and thereby decreases its catalytic activity for the methanol synthesis.

Accordingly, it is an object of this invention to provide a process for the synthesis of methanol and its equivalent, methyl ether, from carbon monoxide and hydrogen and to prevent the deleterious effect of carbon dioxide upon the catalytic activity of the contact material used for the synthesis of the methanol and methyl ether by excluding carbon dioxide from the gases passed into contact with the catalyst in a gas circulatory system. Other objects of the invention will be obvious or will appear hereinafter.

The process of this invention comprises a modification of the known process for the synthesis of methanol wherein a gas containing hydrogen and carbon monoxide is passed in contact with the catalyst promoting the synthesis of methanol from the hydrogen and carbon monoxide in a gas circulatory synthesis system in which the gas leaving contact with the catalyst is treated to remove the synthesized methanol and methyl ether, which constitute more than 50% of the oxygenated organic compounds formed by the reaction of the carbon monoxide and hydrogen, and the residual unreacted gas is repeatedly recycled into contact with the catalyst without subjecting it to treatment for removal of carbon dioxide specifically. In such a process fresh make-up gas containing hydrogen and carbon monoxide is introduced into the circulatory synthesis system and a portion of the gas circulating therein is bled from the system. In practicing this invention in conjunction with the described procedure for synthesizing methanol, the carbon dioxide content of the gas introduced into contact with the catalyst is maintained below the equilibrium $CO_2$ concentration of the gas circulating in the system, preferably at not more than about 1%, thereby increasing the activity of the catalyst for the synthesis of methanol as compared with the prior processes in which the gas introduced into contact with the catalyst contains higher proportions of carbon dioxide.

The process of this invention employs the procedural steps heretofore used for methanol synthesis and recovery in a gas circulatory system but, in addition thereto, provides a means for removing carbon dioxide from the circulating gases in the methanol synthesis system prior to their return into renewed contact with the catalyst and from the make-up gas supplied to the system, when this gas contains carbon dioxide, either before or after the introduction of the make-up gas into the methanol synthesis system itself. A suitable means for removing carbon dioxide from the carbon monoxide-hydrogen gases is a liquid solvent for carbon dioxide with which the gases are scrubbed prior to contact with the catalyst. Any of the well known absorbents for carbon dioxide may be employed in carrying out this invention and they may be contacted with the carbon monoxide-hydrogen gas in the conventional types of scrubber used for washing a gas with a liquid.

The accompanying drawing illustrates one method of carrying out the process of this invention. In the drawing there is illustrated a conventional gas circulatory system for methanol synthesis which comprises a gas preheater and converter 1 containing a methanol synthesis catalyst and a liquefier 2 for cooling the gases leaving the converter and thereby condensing the oxygenated organic compounds synthesized from the carbon monoxide and hydrogen in their passage in contact with the catalyst in converter 1. A circulator or pump 3 is provided for continuously circulating the carbon monoxide and hydrogen gas through the preheater and converter and the liquefier. A pipe 4 for withdrawing the gas from the circulatory system after liquefier 2 and a pipe 5 for introducing fresh make-up gas containing carbon monoxide and hydrogen into the system are provided.

In carrying out the process of this invention, this conventional methanol synthesis system is modified to insert a carbon dioxide scrubber 6 in the gas circulatory system between the circulator 3 and the point of introduction of the fresh make-up gas. This scrubber takes the form of a gas-liquid contact tower into the bottom of which the circulating gases enter and in which they are contacted with a liquid absorbent for carbon dioxide introduced to the top of the scrubber and passed downwardly therethrough in direct contact with the ascending gases. The gases thus treated to remove carbon dioxide leave the top of the tower and pass through circulator 3 to the preheater and converter.

In the procedure illustrated in the drawings the carbon dioxide absorbent is the liquefied methanol recovered from the circulating gases in liquefier 2 after this methanol has been treated in a carbon dioxide desorber 7, preferably at about atmospheric pressure, with air or other gas to strip from it the carbon dioxide absorbed in condensing the liquid from the gases in the gas circulatory system. This air is admitted to the bottom of desorber 7 and passed upwardly therein in contact with the descending flow of liquid methanol. The air leaves the top of the desorber carrying with it the carbon dioxide stripped from the liquid. The thus treated methanol is pumped by means of a pump 8 into the top of carbon dioxide scrubber 6 in which it is contacted with the gas passed through the scrubber under the high pressures maintained in the gas circulatory system. After absorbing carbon dioxide from the gases in this scrubber, the methanol flows through a pipe 9 into the top of desorber 7 where it is again stripped of its carbon dioxide for return into renewed contact with the gas in scrubber 6. As methanol is synthesized in the synthesis system and recovered from liquefier 2 the methanol produced in excess of that circulated through scrubber 6 is withdrawn from the system through a pipe 10. When a solvent for carbon dioxide other than the methanol product of the synthesis process itself is to be used, it is preferred to use a solvent other than methanol because of the relatively low solubility of carbon dioxide in methanol.

In practicing the process of this invention, the methanol synthesis system comprising the preheater and converter 1, liquefier 2 and circulator 3 with the supply of fresh make-up gas and withdrawal of bleed gas from this system may be operated in any of the known methods for the synthesis of oxygenated organic compounds of which more than 50% consists of methanol and its equivalent, methyl ether. Thus, the catalyst in converter 1 is any contact material which is active for the synthesis of methanol from carbon monoxide and hydrogen, especially one free from oxides and salts of the alkali and alkaline earth metals. The gas is circulated in contact with the catalyst at space velocities and temperatures at which the catalyst is active for methanol synthesis and under pressures of, for example, 50 atmospheres or higher. In liquefier 2 the circulating gases are cooled by indirect contact with a cooled medium such as water at ordinary temperatures, whereby the gas may be cooled to about 25° C. and the oxygenated organic compounds in the gas are liquefied and removed from the gas. In carrying out the process of the invention, however, by scrubbing the circulating gases in scrubber 6 by means of the methanol product from which the carbon dioxide contained in it as it leaves liquefier 2 has been removed, the carbon dioxide content of the gas returned into contact with the catalyst in converter 1 is maintained much below the equilibrium $CO_2$ pressure for the methanol synthesis system, thereby preventing the decrease in activity of the catalyst which occurs when the recirculated gas leaving liquefier 2 is reintroduced into contact with the catalyst without first scrubbing it to remove carbon dioxide. In scrubber 6 carbon dioxide which may be contained in the fresh make-up gas introduced to the synthesis system is also removed.

While the synthesis of methanol may be carried out employing the procedure of this invention under the conditions described above, I have found that methanol synthesis catalysts which are composed of zinc oxide promoted with one or more other oxides, such as an oxide of chromium, are particularly subject to poisoning by carbon dioxide in the gases contacted with the catalyst. Accordingly, the process of this invention is particularly applicable to the synthesis of methanol employing such a catalyst. It is preferred to operate this and other catalysts at temperatures of about 300° to 340° C., under pressures of about 100 to 200 atmospheres with the gas being passed through the catalyst at a space velocity of about 10,000 to 20,000 (based on the volume, at standard temperature and pressure, of non-condensable gas leaving the catalyst per hour per volume of catalyst). Under these preferred conditions of operation the presence of more carbon dioxide in the gases contacted with the catalyst particularly reduces the activity of the catalyst for synthesizing methanol from the carbon monoxide and hydrogen and the exclusion of substantial quantities of carbon dioxide from the gas introduced to the catalyst in accordance with the process of this invention is especially advantageous.

While it is preferred to carry out the process of this invention in the manner described, numerous changes and modifications therein may be made. For example, if the fresh make-up gas introduced into the methanol synthesis system is free from carbon dioxide it is unnecessary to pass this make-up gas through the carbon dioxide scrubber together with the recirculated gases. Instead of using separate apparatus for liquefying the synthesized product from the gases leaving the preheater and converter and for scrubbing carbon dioxide from these gases, the removal of carbon dioxide may be accomplished simultaneously with the liquefaction of the synthesized product by directly contacting the gases in liquefier 2 with cooled methanol circulated through this liquefier and carbon dioxide desorber 7. In some cases it is possible to remove the carbon dioxide from the synthesized gases to a sufficient degree by the liquefied product as it is condensed from the gases leaving the converter without having to desorb carbon dioxide from this product and recirculate it into contact with the gases. In such a procedure, however, the gases leaving the converter should be passed upwardly through a liquefier in countercurrent flow with a descending flow of condensate from the gases and the gases and condensate should be refrigerated to a sufficiently low temperature that the solubility of carbon dioxide in the condensate is high enough to absorb and remove the carbon dioxide from the gases until the residual carbon dioxide content thereof is only a minor proportion of that which would be left in the gas merely by cooling it to condense the methanol, e. g. is below 1%. In carrying out the process in accordance with this modification the fresh make-up gas, which originally will usually contain a substantial concentration of carbon dioxide, should be scrubbed with an absorbent for carbon dioxide before introducing the gas into the synthesis system.

While I have particularly described above the use of liquid methanol containing methyl ether and other oxygenated organic compounds which is formed as the product of the synthesis of methanol from hydrogen and carbon monoxide as the absorbent for carbon dioxide from the synthesis gases, there are numerous other absorbents which may be employed. The choice of the absorbent may in some cases be dictated by the use to which the methanol product of the process is to be put. For example, if pure methanol is to be produced, one may employ a solution of sodium hydroxide or sodium carbonate. Methyl ether, recovered from the crude methanol product of the synthesis process, may be employed as the carbon dioxide absorbent and the gas contacted with this absorbent at a low temperature. On the other hand, if the methanol is to be used as an anti-freeze compound, where small amounts of impurities are not disadvantageous, a solvent such as isopropyl alcohol, isopropyl ether or mixed alkyl or aryl ethers, preferably those having a relatively high boiling point range, are suitable. High boiling hydrocarbons and polyoxygenated compounds such as petroleum oil fractions or ethylene glycol are suitable where the methanol product is to be put to uses in which a small amount of these impurities in the product is not disadvantageous.

I claim:

1. In a process for the synthesis of methanol wherein a gas containing hydrogen and carbon monoxide is circulated in a cyclic system wherein it is passed under high pressure in contact with a catalyst promoting the synthesis of methanol from the hydrogen and carbon monoxide, the gas after contact with the catalyst is treated to remove methanol and the residual gas from which the methanol has been removed is recirculated into contact with the catalyst, and wherein the gas introduced into contact with the catalyst contains an equilibrium concentration of carbon dioxide, that improvement which comprises contacting said gas containing hydrogen and carbon monoxide with a methanol synthesis catalyst which is free from oxides and salts of the alkali and alkaline earth metals at a temperature of 300° C. to 340° C. and at a space velocity of 10,000 to 20,000 and removing from the gas circulating in said cyclic system carbon dioxide in amount such that the gas introduced into contact with the catalyst contains materially less carbon dioxide than said equilibrium concentration, thereby preventing the substantial decrease in catalytic activity of said catalyst which results when the gas introduced into contact therewith contains said equilibrium concentration of carbon dioxide.

2. In a process for the synthesis of methanol wherein a gas containing hydrogen and carbon monoxide is circulated in a cyclic system wherein it is passed under high pressure in contact with a catalyst promoting the synthesis of methanol from the hydrogen and carbon monoxide, the gas after contact with the catalyst is cooled to condense methanol and the residual gas from which the methanol has been condensed is recirculated into contact with the catalyst, and wherein the gas introduced into contact with the catalyst contains an equilibrium concentration of carbon dioxide, that improvement which comprises contacting said gas containing hydrogen and carbon monoxide with a methanol synthesis catalyst which is free from oxides and salts of the alkali and alkaline earth metals at a temperature of 300° C. to 340° C. and at a space velocity of 10,000 to 20,000 and, prior to recirculating the residual gas from which methanol has been condensed into contact with said catalyst, scrubbing said residual gas with a liquid which absorbs and removes therefrom the carbon dioxide left in the residual gas after condensation of methanol therefrom, and by thus scrubbing the residual gas substantially completely removing therefrom the carbon dioxide contained therein, thereby maintaining in the gas introduced into contact with the catalyst a carbon dioxide content materially less than said equilibrium concentration to prevent the substantial decrease in catalytic activity of said catalyst which results when the gas introduced into contact therewith contains said equilibrium concentration of carbon dioxide.

3. In a process for the synthesis of methanol wherein a gas containing hydrogen and carbon monoxide is passed under high pressure in contact with a catalyst promoting the synthesis of methanol from the hydrogen and carbon monoxide, the gas after contact with the catalyst is treated to remove methanol, the residual gas from which the methanol has been removed is recycled into contact with the catalyst, and the gas circulated into contact with the catalyst contains substantially more than 1% carbon dioxide, that improvement which comprises contacting said gas with a methanol synthesis catalyst which is free from oxides and salts of the alkali and alkaline earth metals at a temperature at 300° C. to 340° C. and at a space velocity of 10,000 to 20,000 and removing from the gas containing hydrogen and carbon monoxide which is subsequently passed into contact with said catalyst carbon dioxide in amount such that the gas passing into contact with said catalyst contains not above substantially 1% carbon dioxide, thereby preventing the substantial decrease in catalytic activity of said catalyst which results when the gas introduced into contact therewith contains more than substantially 1% carbon dioxide.

4. In a process for the synthesis of methanol wherein a gas containing hydrogen and carbon monoxide is passed under high pressure in contact with a catalyst promoting the synthesis of methanol from the hydrogen and carbon monoxide, the gas after contact with the catalyst is treated to remove methanol, the residual gas from which the methanol has been removed is recycled into contact with the catalyst, and the gas circulated into contact with the catalyst contains substantially more than 1% carbon dioxide, that improvement which comprises contacting said gas with a methanol synthesis catalyst comprising zinc oxide and an oxide of chromium at a temperature of 300° C. to 340° C. and at a space velocity of 10,000 to 20,000 and removing from the gas containing hydrogen and carbon monoxide which is subsequently passed into contact with said catalyst carbon dioxide in amount such that the gas passing into contact with said catalyst contains not above substantially 1% carbon dioxide, thereby preventing the substantial decrease in catalytic activity of said catalyst which results when the gas introduced into contact therewith contains more than substantially 1% carbon dioxide.

5. In a process for the synthesis of methanol wherein a gas containing hydrogen and carbon monoxide is passed in contact with a catalyst promoting the synthesis of methanol from the hydrogen and carbon monoxide, the gas after contact with the catalyst contains carbon dioxide and synthetic oxygenated organic compounds of which more than 50% is methanol and methyl ether formed by reaction of said hydrogen and carbon monoxide, said gas after contact with the catalyst is treated to remove methanol, the residual gas from which the methanol has been removed is recycled into contact with the catalyst, and the gas circulated into contact with the catalyst contains substantially more than 1% carbon dioxide, that improvement which comprises removing from the gas containing hydrogen and carbon monoxide which is subsequently passed into contact with said catalyst carbon dioxide in amount such that the gas passing into contact with said catalyst contains not above substantially 1% carbon dioxide, thereby preventing the substantial decrease in catalytic activity of said catalyst which results when the gas introduced into contact therewith contains more than substantially 1% carbon dioxide.

6. In a process for the synthesis of methanol wherein a gas containing hydrogen and carbon monoxide is circulated in a cyclic system wherein it is passed in contact with a catalyst promoting the synthesis of methanol from the hydrogen and carbon monoxide, the gas after contact with the catalyst contains carbon dioxide and synthetic oxygenated organic compounds of which more than 50% is methanol and methyl ether formed by reaction of said hydrogen and carbon monoxide, said gas after contact with the catalyst is treated to remove methanol, the residual gas from which the methanol has been removed is recycled into contact with the catalyst and wherein the gas introduced into contact with the catalyst contains an equilibrium concentration of carbon dioxide, that improvement which comprises removing from the gas circulated into contact with the catalyst in said cyclic system carbon dioxide in amount such that the gas introduced into contact with the catalyst contains materially less carbon dioxide than said equilibrium concentration, thereby preventing the substantial decrease in catalytic activity of said catalyst which results when the gas introduced into contact therewith contains said equilibrium concentration of carbon dioxide.

7. In a process for the synthesis of methanol wherein a gas containing hydrogen and carbon monoxide is passed in contact with a catalyst promoting the synthesis of methanol from the hydrogen and carbon monoxide, the gas after contact with the catalyst contains carbon dioxide and synthetic oxygenated organic compounds of which more than 50% in methanol and methyl ether formed by reaction of said hydrogen and carbon monoxide, said gas after contact with the catalyst is cooled to condense methanol, the residual gas from which the methanol has been removed is recycled together with fresh make-up gas containing hydrogen and carbon monoxide into contact with the catalyst, and the gas circulated into contact with the catalyst contains substantially more than 1% carbon dioxide, that improvement which comprises scrubbing said residual gas from which the methanol has been condensed and removed and said make-up gas with a liquid which absorbs and removes therefrom carbon dioxide left in the residual gas and which may be present in said make-up gas, said residual gas and make-up gas being scrubbed with said liquid until they contain not above substantially 1% carbon dioxide, thereby preventing the substantial decrease in catalytic activity of said catalyst which results when the gas introduced into contact therewith contains more than substantially 1% carbon dioxide.

8. In a process for the synthesis of methanol wherein a gas containing hydrogen and carbon monoxide is passed in contact with a catalyst promoting the synthesis of methanol from the hydrogen and carbon monoxide, the gas after contact with the catalyst contains carbon dioxide and synthetic oxygenated organic compounds of which more than 50% is methanol and methyl ether formed by reaction of said hydrogen and carbon monoxide, said gas after contact with the catalyst is cooled to condense methanol, the residual gas from which the methanol has been removed is recycled together with fresh make-up gas containing hydrogen and carbon monoxide into contact with the catalyst, and the gas circulated into contact with the catalyst contains substantially more than 1% carbon dioxide, that improvement which comprises separating the condensed methanol from the residual uncondensed gas, removing dissolved carbon dioxide from the thus separated methanol, returning methanol thus treated to remove carbon dioxide from it into contact with the residual uncondensed gas in amounts sufficient to absorb carbon dioxide therefrom and to reduce the carbon dioxide content of the residual gas to not above substantially 1% carbon dioxide and returning the thus treated residual gas together with fresh make-up gas containing hydrogen and carbon monoxide and not above substantially 1% carbon dioxide into contact with said catalyst.

9. In a process for the synthesis of methanol wherein a gas containing hydrogen and carbon monoxide is circulated in a cyclic system wherein it is passed under high pressure in contact with a catalyst promoting the synthesis of methanol from the hydrogen and carbon monoxide, the gas after contact with the catalyst is treated to remove methanol and the residual gas from which the methanol has been removed is recirculated into contact with the catalyst, and wherein the gas introduced into contact with the catalyst contains an equilibrium concentration of carbon dioxide, that improvement which comprises removing from the aforesaid methanol carbon dioxide dissolved therein, returning thus treated methanol into contact with the aforesaid residual gas, scrubbing the residual gas with this methanol in amount sufficient to reduce the carbon dioxide content of the residual gas to materially less than the aforesaid equilibrium concentration of carbon dioxide and returning the thus treated residual gas together with fresh make-up gas containing hydrogen and carbon monoxide into contact with said catalyst.

10. In a process for the synthesis of methanol wherein a gas containing hydrogen and carbon monoxide is circulated in a cyclic system wherein it is passed under high pressure in contact with a catalyst promoting the synthesis of methanol from the hydrogen and carbon monoxide, the gas after contact with the catalyst is treated to remove methanol product of said synthesis and the residual gas from which the methanol product has been removed is recirculated into contact with the catalyst, and wherein the gas introduced into contact with the catalyst contains an equilibrium concentration of carbon dioxide, that improvement which comprises scrubbing said residual gas containing carbon dioxide with liquid methanol under conditions at which the liquid methanol absorbs carbon dioxide from said residual gas and the carbon dioxide content of said residual gas is reduced to a concentration below said equilibrium concentration.

RALPH LYMAN BROWN.